United States Patent [19]

Miller et al.

[11] Patent Number: 4,499,112
[45] Date of Patent: Feb. 12, 1985

[54] PROCESS FOR FORMING SOLID JUICE COMPOSITION AND PRODUCT OF THE PROCESS

[75] Inventors: Dennis H. Miller, Rancho Cucamonga; Jerry R. Mutka, Corona, both of Calif.

[73] Assignee: Sunkist Growers, Inc., Sherman Oaks, Calif.

[21] Appl. No.: 477,234

[22] Filed: Mar. 21, 1983

[51] Int. Cl.$^3$ .......................... A23L 2/26; A23L 2/10
[52] U.S. Cl. .................................. 426/276; 426/599; 426/658; 426/515
[58] Field of Search ................ 426/96, 276, 456, 599, 426/615, 639, 516, 471, 590, 515

[56] References Cited

U.S. PATENT DOCUMENTS

| | | | |
|---|---|---|---|
| 2,855,315 | 10/1958 | Perrozzi et al. | 426/103 |
| 2,857,281 | 10/1958 | Schultz et al. | 426/651 |
| 3,041,180 | 6/1962 | Swisher | 426/651 |
| 3,704,137 | 11/1972 | Beck | 426/651 |
| 4,271,202 | 6/1981 | Giel | 426/650 |

FOREIGN PATENT DOCUMENTS 23060  10/1963  Japan ..................... 426/96

Primary Examiner—Robert Yoncoskie
Assistant Examiner—Elizabeth C. Weimar
Attorney, Agent, or Firm—Paul A. Weilein

[57] ABSTRACT

A process is disclosed for making a relatively stable non-hygroscopic solid juice composition as well as a product of the process. The process comprises the steps of clarifying and concentrating a selected aqueous juice to a minimum concentration of about 85° BRIX, separately mixing together a sugar and a starch hydrolysate having a maximum dextrose equivalent of about 20, heating the mixture to about its boiling point and blending the mixture and the aqueous juice in relative amounts to form a homogeneous melt. The melt is then extruded into a relatively cool liquid solvent, such as isopropanol, to convert the melt into an extruded solid. The extruded solids are then ground into particles, separated from excess solvent, combined with a selected anti-caking agent and dried to form the aqueous juice composition into a relatively stable particulate solid of superior amorphous quality. Preferably, the starch hydrolysate is selected to have a dextrose equivalent of about 10 with the clarified juice having a concentration in the range of approximately 85°-95° BRIX. The sugar is preferably lactose selected for its ability to reduce the boiling point of the mixture, thereby achieving superior organoleptic characteristics in the solid juice concentrate, and for its ability to reduce hygroscopicity of the solid juice composition.

27 Claims, 1 Drawing Figure

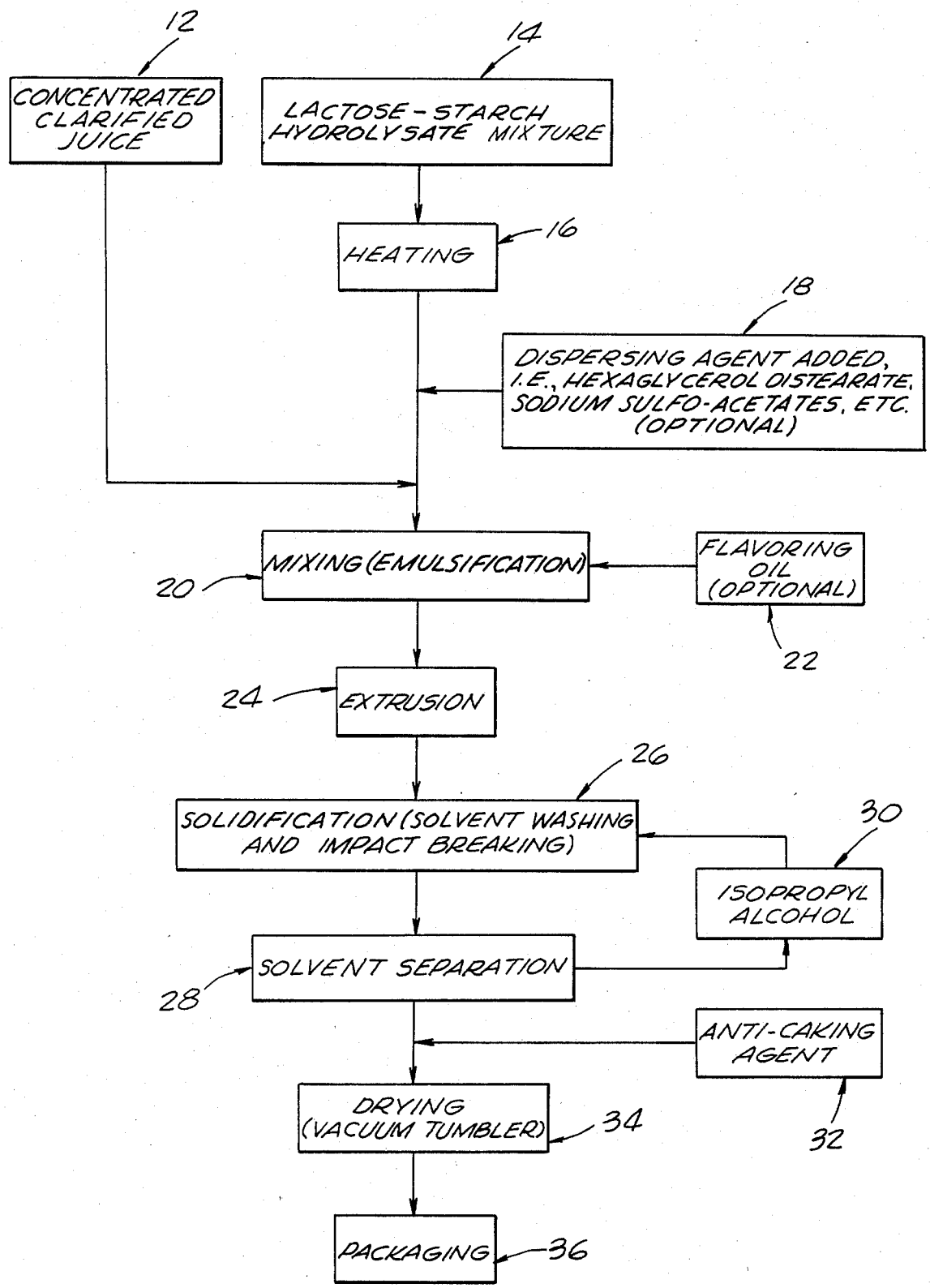

PROCESS FOR FORMING SOLID JUICE COMPOSITION AND PRODUCT OF THE PROCESS

BACKGROUND OF THE INVENTION

The present invention relates to a process for producing a high quality, solid juice composition with relatively stable characteristics as well as a product of the process. More particularly, the invention relates to such a process wherein the juice component is clarified and then concentrated to a minimum concentration of about 85° BRIX before blending it with a heated mixture of a sugar and starch hydrolysate in relative amounts to form a homogeneous melt suitable for extrusion and formation into particles of selected shape and size.

In the prior art, spray drying has long been used as the most conventional method for commercially dehydrating many foods including citrus juices and other juices. However, the high temperatures necessarily involved during such spray drying processes have tended to eliminate or impair various heat sensitive flavors of the juices. Furthermore, juice solids formed by spray drying commonly exhibit high hygroscopic characteristics which cause difficulty in the spray drying operations themselves as well as in handling of the finished juice solids. It has also been found that spray dried juices typically exhibit a relatively limited shelf life. Within the prior art, spray drying techniques for forming juice solids are disclosed, for example, by Giel in U.S. Pat. No. 4,271,202, issued June 2, 1981 and by Gupta in U.S. Pat. No. 4,112,130, issued Sept. 5, 1978.

There has thus been found to remain a need for a process for forming relatively stable solid juice compositions where the juice component is not subjected to the high temperatures necessarily involved, for example, in spray drying. In addition, there has been found to remain a need for a solid juice composition having superior organoleptic characteristics as well as being relatively stable and free flowing.

SUMMARY OF THE INVENTION

It is therefore an object of the invention to provide a process for forming a solid juice composition in particulate form which is relatively stable and noncrystallizable as well as a product of the process. Such a product has been found to be useful, with a relatively high percentage of a juice component, for use in the preparation of beverage products as well as for use in the flavoring of food products such as pastries and the like.

It is a further object of the invention to provide such a process and product of the process wherein a selected juice is first clarified and then concentrated to a minimum concentration of about 85° BRIX, the clarified juice concentrate then being blended with a heated mixture of a sugar and starch hydrolysate in relative amounts to form a homogeneous melt capable of extrusion into a relatively cool liquid solvent and formation thereafter into particles of selected shape and size. The particles formed by such a process are then preferably separated from the solvent and dried in combination with a selected anti-caking agent to produce a relatively stable aqueous juice composition in particulate form which is also characterized by minimum hygroscopicity.

The preceding objects of the invention are contrasted with the prior art as characterized, for example, in Beck U.S. Pat. No. 3,704,137, issued Nov. 28, 1972 and Swisher U.S. Pat. No. 3,041,180, issued June 26, 1962. In Swisher is disclosed in some detail a method for forming a solid flavoring composition from a homogeneous melt capable of extrusion into a selected liquid solvent to form a solid. Beck furthermore disclosed the use of a hydrolyzed cereal solids having a comparatively low dextrose equivalent of about 20 or less in a composition of the type disclosed by Swisher in order to reduce the tendency of the final product to agglomerate upon long standing. Thus, Beck and Swisher disclosed the possibility of forming flavoring compositions without the need for spray drying as taught, for example, by Gupta and Giel. However, Beck and Swisher only disclosed such flavoring compositions based on the use of flavoring oils. They did not disclose or even suggest the possibility of forming such products with an aqueous juice as a major component as is taught by the present invention. Furthermore, the Beck and Swisher references failed to recognize the advantages of lactose in such products as is described in substantial detail below.

It is yet a further object of the invention to provide such a process wherein lactose is selected as the sugar formed into an aqueous mixture with the starch hydrolysate. As will be discussed in greater detail below, the aqueous mixture of sugar and starch hydrolysate is heated or cooked to above its boiling point as necessary to form a melt and maintained at an elevated temperature for a sufficient time to reduce the water content of the mixture. It has been found that the use of lactose reduces the cook temperature of the mixture to the range of approximately 110°–114° C. as contrasted to a cook temperature in the range of approximately 116°–130° C. for other simple sugars. This reduced cook temperature for the aqueous mixture of sugar and starch hydrolysate permits the mixture to achieve the necessary characteristics for forming a homogeneous melt as described below while minimizing undesirable flavors in the product. In addition, it has been found that the use of lactose further reduces hygroscopicity of the resulting product while improving its shelf life.

The invention has been summarized above with emphasis on use of a clarified juice component which is concentrated to a minimum concentration of about 85° BRIX and then blended with a sugar-starch hydrolysate mixture to form a homogeneous melt. As noted above, the melt is extruded into a cool solvent and otherwise treated to form the final particulate solid product of the invention.

This preferred minimum concentration of the clarified juice component has been found to contribute greatly to desirable characteristics, particularly organoleptic properties such as taste. However, variations of the invention, in terms of concentration of the juice component, are possible which will permit formation of a similar final particulate solid but without the same degree of desirable organoleptic qualities. For example, lower initial concentration of the juice component is possible if the subsequent melt is heated or otherwise treated to reduce the water content to a level generally equivalent to an initial minimum concentration of about 85° BRIX for the juice component.

The present invention thus particularly contemplates the use of juice components having concentrations a few degrees below 85° BRIX since satisfactory but not optimum characteristics might be retained during heating. A finished particulate product could also be developed by using a juice component having a concentration as low as 60° BRIX, for example. However, the substantial additional heating required to reach a satisfactory water content for achieving particle stability would have a very deleterious effect on organoleptic characteristics of the finished product.

Accordingly, it is also an object of the invention to form a solid aqueous juice composition in particulate form wherein the water content is reduced during processing to a final level generally equivalent to an initial minimum juice component concentration of about 85° BRIX.

Additional objects and advantages of the invention will be apparent from the following description. For example, it will be noted below that the solid juice composition is preferably formed into "rod shaped" particles which have been found to be very suitable particularly for use in the preparation of beverage products as described above. However, it is also noted below that other shapes and sizes of particles may be formed according to the invention. For example, it is noted below that the process may even be adapted for forming relatively large particles for use in other food products. The process of the invention is also preferably contemplated for forming solid juice compositions where the aqueous juice component is the only flavor component. However, it is also noted below that flavor variation is possible, for example, by combining an essential oil from a selected citrus fruit as well as its aqueous juice component into the solid juice composition. In such an event, it is, of course, necessary to add a suitable emulsifier in order to combine the flavoring oil and clarified juice concentrate into the solid juice composition. In any event, the following description is set forth having reference to the accompanying drawing.

BRIEF DESCRIPTION OF THE DRAWING

The single drawing depicts a block-type flow sheet including the steps of the process of the present invention and for forming its product.

DETAILED DESCRIPTION OF THE PREFERRED EMBODIMENTS

As noted above, the present invention relates to a process for forming or preparing a solid juice composition as well as a product of the process. Generally, the process comprises the steps of (1) clarifying and concentrating a selected aqueous juice to a minimum concentration of about 85° BRIX, (2) heating to a suitable cook temperature an aqueous mixture of a sugar and a starch hydrolysate having a maximum dextrose equivalent of about 20, (3) blending the aqueous mixture and the juice flavoring in relative amounts to form a homogeneous melt capable of formation into solid particles as described below, (4) extruding the melt into a relatively cool liquid solvent to thereafter form particles of selected shape and size, and (5) drying the particles in combination with a selected anti-caking agent to produce a relatively stable and nonhydroscopic aqueous juice composition in particulate form.

As noted above, the Beck and Swisher references discuss in substantial detail the manner in which a homogeneous melt may be formed from an aqueous mixture of a sugar and a starch hydrolysate together with a separate flavor component. Those references also discuss the manner in which such a homogeneous melt may be extruded into a cool liquid solvent to form particles of selected shape and size as well as the selection of an anti-caking agent for combination with such a product in its final stage to maintain it in a more stable condition. Accordingly, those references are incorporated herein as though set forth in full with respect to the particular features referred to above.

Prior to its addition to the hot lactose-starch hydrolysate mixture, the juice component is clarified and concentrated to a minimum concentration of about 85° BRIX or more. As is well known in the prior art, natural strength juice, for example, from citrus fruits or other fruits can be clarified by commercial methods of ultrafiltration or enzymatic treatment. The need for clarification of the juice component has been found necessary in order to avoid severe viscosity problems when the juice is subsequently concentrated. Even with the juice being clarified in the manner disclosed, it is generally possible to concentrate the juices to approximately 93° BRIX, for example, by means of a suitable rotary vacuum evaporator, without again encountering such viscosity problems. A juice component having a minimum concentration of about 85° BRIX has been found to provide the maximum amount of water which can be tolerated in the solid juice concentrate product of this invention. Referring to the flow sheet shown in the drawing, the combined steps of clarifying and concentrating the juice component are indicated at 12.

As indicated at 14 in the drawing, a selected sugar and starch hydrolysate are mixed together with additional water as required. The mixture is then agitated and uniformly mixed. As will be discussed in greater detail below, the sugar may be any of the simple sugars such as sucrose, levulose, dextrose, fructose or maltose, for example. However, lactose is preferred for various reasons set forth herein in order to achieve both improved flavor of the solid juice composition as well as achieving lower hygroscopicity in the final product. Initially, the mixture indicated at 14 comprises approximately 13–30% by weight water, 20–30% by weight sugar and 45–60% by weight low DE starch hydrolysate. Where the sugar is lactose and the starch hydrolysate is malto-dextrin (10 DE), the preferable mixture at 14 includes approximately 23% by weight water, 26% by weight lactose and 51% by weight of 10 DE maltodextrin.

The mixture 14 is then charged to a suitable heating vessel, indicated at 16, and heated to a suitable cooked temperature above its boiling point. As noted above, a suitable cooked temperature for mixtures including most sugars may extend across a range of approximately 116°–130° C. However, where the sugar is lactose as noted above, the cooked temperature of the mixture is approximately 110°–114° C. and the mixture is heated to a temperature within that range, such as 111° C.

If a flavoring oil is to be added to the product as described below, an emulsifying agent such as hexaglycerol distearate, indicated at 18, is added to the mixture from the heating vessel 16 in order to facilitate incorporation of the oil. If such a flavoring oil is to be added, the emulsifying or dispersing agent is added to the mixture from the heating vessel 16 prior to combination with the clarified and concentrated juice component 12.

In any event, whether or not an emulsifying or dispersing agent is added, the mixture from the heating vessel 16 and the juice component 12 are combined and charged to a suitable blender 20. The blender 20 and the heating vessel 16 may be the same unit. The juice concentrate 12 is preferably added last to the blender 20 in order to minimize off-flavor production. In addition, the temperature of the concentrated and clarified juice 12 is preferably raised, for example, to about 60°-80° C. in order to reduce its viscosity and facilitate its transfer to the blender 20.

As noted above, an optional flavoring oil 22 may be added to the blended solution of the sugar-starch hydrolysate and juice component in the blender 20 if desired. The flavoring oil added would comprise a minimum of about 0.10-11.0% by weight of the final product. For example, approximately 0.5% by weight of an orange oil is preferred for use in a 10% orange juice-containing dry beverage mix. The use of a flavoring oil thus results in a product incorporating both aqueous and oil-based flavors in the solid aqueous juice composition of the invention.

The relative proportions of the juice component 12, the mixture 14 from the heating vessel 16 and the flavoring oil 22 (if added) are selected to achieve a homogeneous melt condition for passage to the extruder 24 from the blender 20. Generally, as is also discussed in the Beck and Swisher references, this homogeneous melt is defined as having a plastic condition suitable for forming a solid product in the manner defined below to have an amorphous character for achieving high stability over an extended period of time.

The extruder 24 has die openings of sizes selected in accordance with the size and shape desired for the resulting solid juice particles. For example, where small particles are desired for use in a beverage, the fluid blend or homogeneous melt from the blender 20 is extruded either mechanically or under a head of gas pressure through openings (not shown) in the extruder having diameters, for example, of 1/64 inch.

Extruded filaments or shapes of the homogeneous blend passing through the extruder 24 are then allowed to drop through air into a cold organic solvent, such as isopropanol at about −20° C., as generally indicated at 26. The function of the isopropanol or other solvent is threefold. Initially, it acts as a coolant to rapidly solidify the extruded shapes of homogeneous melt. Secondly, it removes any oil which may be present on the surface of the extruded solids, for example, from addition of flavoring oil 22, which would otherwise be readily susceptible to oxidation. Thirdly, it removes excess moisture from the extruded solids in order to further enhance stability and shelf life of the end product.

In addition to achieving solidification and dehydration, solid particles from the extruder 24 may also be broken up within the vessel 26, for example, by means of impact breaking action of an agitator impeller (not shown) to produce a desired particle size and shape.

Following the solvent wash step at 26, the extruded solids are then screened or centrifuged at 28 to remove the organic solvent. The solvent is then transferred to a holding tank 30 for return to the container 26 as needed. The extruded solids from the separator 28 are combined with an anti-caking agent 32 such as silica and introduced into a heated rotary vacuum drier 34. Upon heating, the moisture content is reduced from the range of about 12% to approximately 5%. The particles are then screened by passage over a succession of sizing screens (not shown) and packaged, preferably in a dehumidified room, as indicated at 36.

The process described above and its product may be enhanced by additional steps known to those skilled in the art. For example, the particles may be incorporated together with appropriate flavorings, sugar and/or other ingredients to form consumer products.

In addition, the process of the present invention may be used for preparing solid juice compositions from various sources. In particular, it is contemplated that the process of the invention may be used in conjunction with various citrus fruits such as oranges, grapefruit, lemons, etc. In addition, the process of the invention may also be used in conjunction with other fruits such as apples, berries, etc. Accordingly, a similar variety of products could be obtained from the process of the invention.

The following examples of various embodiments are presented to further illustrate and exemplify but not to limit the invention.

EXAMPLE 1

Orange Juice 1,720 grams of 10 DE malto-dextrin (5% by weight water), 860 grams of lactose (5% by weight water) and 600 grams of water were mixed in a steam jacketed stainless steel kettle provided with an agitator and thermometer. The mixture was agitated and heated to a temperature of approximately 114° C., at which time its water content was reduced to approximately 8-10% by weight. At the same time, 1,870 grams of 87° BRIX clarified orange juice concentrate was heated to about 80° C. and blended with the sugar-starch hydrolysate mixture. After continuous stirring to obtain a uniform composition, the melt was poured into a steam jacketed leg arranged vertically with a bottom extrusion plate containing small holes (about 1/64 inch diameter). The melt was extruded under nitrogen pressure of 20 pounds per square inch into isopropanol at −20° C. to solidify the extruded material. Impact breaking of the extruded material was accomplished by the use of a Mooney Machine Impeller Mixer. The extruded material was allowed to stand under isopropanol for one hour, drained, combined with 100 grams of silica and vacuum dried in a Komline—Sanderson Rotary Conical Vacuum Dryer. The final orange juice solids composition had a water content of 5.2% by weight and a juice component of approximately 40% by weight.

It is to be noted that the steps of Example 1 could also be used with other juices of the types listed above in addition to orange juice.

EXAMPLE 2

Apple Juice 1,720 grams of 10 DE malto-dextrin, 860 grams of lactose and 800 grams of water were mixed in a stem jacketed stainless steel kettle provided with an agitator and thermometer. The mixture was agitated and heated to a temperature of approximately 112° C. and maintained at that temperature until the water percentage of the mixture was reduced to approximately 8-10% by weight. At the same time, 1,870 grams of 85° BRIX clarified apple juice concentrate was heated to approximately 80° C. and added to the sugar-starch hydrolysate mixture. The resulting melt was heated to about 118° C. to further reduce its moisture content. After transferring the amorphous and homogeneous melt to a vertical steam jacketed leg, it was extruded through 1/64 inch diameter holes in a bottom extrusion plate under a nitrogen pressure of 50 p.s.i. into cold isopropanol at −20° C. The extruded solids were stored under isopropanol for 10 minutes prior to impact breaking into "rods" with the use of a Mooney Machine Impeller Mixer. Excess alcohol was drained off and the solid rods were vacuum dried in a rotary conical vacuum drier after being combined with 100 grams of silica. The finished apple juice product had a water content of about 5.6% by weight and a juice component percentage of approximately 40% by weight.

Here again, juices from other fruits in addition to apples could be substituted into Example 2 with the steps of Example 2 otherwise being performed in the same manner as described above.

EXAMPLE 3

Grapefruit Juice and Grapefruit Oil 2,410 grams of 20 DE corn syrup (30% by weight water) and 1,650 grams of sucrose were heated in a steam jacketed stainless steel round bottom kettle provided with an agitator and thermometer. The mixture was heated to about 115° C. after which 60 grams of hexaglycerol distearate was added. At the same time, 1,090 grams of 89° BRIX clarified grapefruit juice concentrate was heated to a temperature of about 80° C. and slowly added to the mixture. The melt was heated to 130° C. to further reduce its moisture content. After additional mixing, 100 grams of grapefruit oil was then added. On completion of oil emulsification, the amorphous melt was transferred to a vertical extrusion leg and extruded through 1/64 inch diameter holes in a bottom extrusion plate under 20 psi of nitrogen pressure into isopropanol at −20° C. After grinding the extruded solids into rods with a Mooney Machine Impeller Mixer, the excess isopropanol was drained off. The rod-shaped solids were then vacuum dried in a rotary conical vacuum drier in combination with 100 grams of silica. The water content of the final product was about 5.5% by weight and the final product included about 1.4% by weight grapefruit oil and about 27% by weight grapefruit juice.

Here again, other fruits, particularly citrus fruits including similar aqueous juice and oil components, could be substituted for the grapefruit juice and grapefruit oil with the steps of Example 3 otherwise being repeated in the same fashion.

EXAMPLE 4

Lemon Juice 1,720 grams of 10 DE malto-dextrin, 860 grams lactose and 600 grams water were mixed in a steam jacketed stainless steel kettle provided with an agitator and thermometer. The mixture was agitated and heated to a temperature of about 100° C. Two grams of FD & C yellow No. 5 was added to enhance the color of the final product. The mixture was then heated to 112° C. Then 1,776 grams of 92° BRIX clarified lemon juice concentrate, preheated to 90° C., was slowly added to the sugar-starch hydrolysate mixture. After a short agitation period, the amorphous homogeneous melt was transferred to a vertical extrusion leg and extruded through 1/64 inch holes in a bottom extrusion plate under 20 p.s.i. of nitrogen into isopropanol at −20° C. Impact breaking of the extruded solids was accomplished with a Mooney Machine Impeller Mixer. The slurry was stirred gently for 48 hours, drained of isopropanol and vacuum dried in a rotary conical vacuum drier after having 100 grams of silica combined therewith. The final lemon juice solids product had about 5.0% by weight water and approximately 40% by weight of lemon juice.

Here again, the steps of Example 4 could be repeated with other juices in place of the lemon juice component.

In view of the preceding description and examples, other modifications and embodiments of the process and resulting product according to the present invention will be apparent to those skilled in the art. Accordingly, the scope of the present invention is defined only by the following appended claims.

What is claimed is:

1. A process for preparing a relatively stable, non-hygroscopic solid composition having an amorphous quality, said composition being derived from an aqueous fruit juice, comprising the steps of:
   clarifying and concentrating a selected aqueous juice to a minimum concentration of about 85° BRIX,
   heating to about its boiling point an aqueous mixture of a sugar and a starch hydrolysate,
   blending said aqueous mixture and said aqueous juice in relative amounts selected for forming a homogeneous melt,
   extruding said melt into a solvent at a temperature effective to form solidified extruded material,
   forming said extruded material into particles, and
   drying said particles in combination with a selected anti-caking agent to produce a relatively stable and non-hygroscopic solid composition in particulate form.

2. The process of claim 1 wherein said starch hydrolysate is selected to have a maximum dextrose equivalent of about 20.

3. The process of claim 1 wherein said sugar is selected from the class consisting of lactose, sucrose, levulose, dextrose, fructose and maltose.

4. The process of claim 1 wherein said sugar is lactose whereby the boiling point of said sugar-starch hydrolysate is reduced to improve flavor of the resulting product and whereby hygroscopicity of the product is reduced.

5. The process of claim 4 wherein said starch hydrolysate has a dextrose equivalent of about 10-20.

6. The process of claim 1 wherein said mixture is cooled and said juice concentrate is heated before being blended together.

7. The process of claim 1 wherein said starch hydrolysate has a dextrose equivalent of about 10-20.

8. The process of claim 1 wherein said clarified aqueous juice is concentrated to a concentration range of about 85°-95° BRIX.

9. The process of claim 1 wherein said solid extruded material in the solvent is fractured into rod-shaped particles.

10. The process of claim 1 wherein an essential flavoring oil and a suitable emulsifier are combined with said mixture and said aqueous juice.

11. The process of claim 10 wherein said aqueous juice is selected as a citrus juice and said essential flavoring oil is an oil of said citrus fruit.

12. The process of claim 1 wherein said anti-caking agent is silica.

13. A process for preparing a relatively stable non-hygroscopic solid composition having an amorphous quality, said composition being derived from an aqueous fruit juice, comprising the steps of:
   clarifying and concentrating a selected aqueous juice to a minimum concentration of about 85° BRIX, heating to about its boiling point an aqueous mixture of a sugar and a starch hydrolysate, blending together said aqueous mixture and said aqueous juice in relative amounts selected for forming a homogeneous melt, said minimum concentration of said aqueous juice and said heating step being selected in order to form a homogeneous melt with a water content generally equivalent to an initial minimum juice component concentration of about 85° BRIX whereby the melt is capable of producing a relatively stable and substantially non-hygroscopic particulate solid, extruding said melt into a solvent at a temperature effective to form solidified extruded material, forming said extruded material into particles, and drying said particles in combination with a selected anti-caking agent to produce a relatively stable and non-hygroscopic solid composition in particulate form.

14. The product of the process of claim 1.
15. The product of the process of claim 2.
16. The product of the process of claim 3.
17. The product of the process of claim 4.
18. The product of the process of claim 5.
19. The product of the process of claim 6.
20. The product of the process of claim 7.
21. The product of the process of claim 8.
22. The product of the process of claim 9.
23. The product of the process of claim 10.
24. The product of the process of claim 11.
25. The product of the process of claim 12.
26. The product of the process of claim 13.
27. The process of claim 1 wherein said solid extruded material is formed into particles by grinding.

* * * * *